(12) United States Patent
Wilhelm

(10) Patent No.: US 6,789,804 B2
(45) Date of Patent: Sep. 14, 2004

(54) DRY GAS SHUTDOWN SEAL

(75) Inventor: Howard Randall Wilhelm, Baltimore, MD (US)

(73) Assignee: Kaydon Corporation, Ann Arbor, MI (US)

(*) Notice: Subject to any disclaimer, the term of this patent is extended or adjusted under 35 U.S.C. 154(b) by 0 days.

(21) Appl. No.: 10/201,179

(22) Filed: Jul. 23, 2002

(65) Prior Publication Data

US 2003/0015842 A1 Jan. 23, 2003

Related U.S. Application Data

(60) Provisional application No. 60/307,271, filed on Jul. 23, 2001.

(51) Int. Cl.[7] .............................. F16J 15/38; F16J 9/00
(52) U.S. Cl. ...................... 277/390; 277/345; 277/361; 277/370; 277/408; 277/431; 277/432
(58) Field of Search ................................. 277/390, 345, 277/346, 347, 350, 353, 361, 370, 408, 431, 432

(56) References Cited

U.S. PATENT DOCUMENTS

| | | | | |
|---|---|---|---|---|
| 1,020,210 A | * | 3/1912 | Lobnitz | 384/139 |
| 2,128,744 A | * | 8/1938 | Hornschuch | 277/387 |
| 2,984,507 A | * | 5/1961 | Welch | 277/408 |
| 2,999,702 A | | 9/1961 | Dunn et al. | |
| 3,099,453 A | | 7/1963 | Dunn et al. | |
| 3,402,671 A | * | 9/1968 | Wilfley et al. | 415/24 |
| 3,560,063 A | | 2/1971 | McCluskey et al. | |
| 3,588,124 A | | 6/1971 | Guinard | |
| 3,589,738 A | * | 6/1971 | Tracy | 277/397 |
| 3,679,217 A | | 7/1972 | Lesiecki | |
| 3,811,687 A | | 5/1974 | Honold et al. | |
| 3,994,503 A | | 11/1976 | Dousse et al. | |
| 4,076,259 A | | 2/1978 | Raimondi | |
| 4,310,163 A | * | 1/1982 | Pippert | 277/562 |
| 4,398,730 A | * | 8/1983 | Rucker et al. | 277/399 |
| 5,039,113 A | * | 8/1991 | Gardner | 277/379 |
| 5,066,026 A | * | 11/1991 | Heck et al. | 277/400 |
| 5,158,431 A | * | 10/1992 | Schellong et al. | 277/369 |
| 5,249,812 A | | 10/1993 | Volden et al. | |
| 5,370,403 A | | 12/1994 | Sedy | |
| 5,516,118 A | | 5/1996 | Jones | |
| 5,529,315 A | | 6/1996 | Borrino et al. | |
| 5,954,341 A | | 9/1999 | Ringer et al. | |
| 6,142,478 A | * | 11/2000 | Pecht et al. | 277/400 |
| 6,517,077 B1 | * | 2/2003 | Enomura | 277/358 |
| 6,524,059 B1 | * | 2/2003 | Nogiwa | 415/26 |

* cited by examiner

*Primary Examiner*—Carlos Lugo
(74) *Attorney, Agent, or Firm*—Price, Heneveld, Cooper, DeWitt & Litton, LLP

(57) ABSTRACT

A dry gas seal has a housing with an annularly-shaped channel disposed concentric with the drive shaft, and an inlet to introduce pressurized buffer gas into the housing interior. An annularly-shaped shutdown piston is slidably received in the housing channel for axial shifting, and includes a circumferential seal between its inside and outside surfaces, and an end seal. A biasing member resiliently urges the shutdown piston toward an open position, such that during compressor operation, the forces generated by the biasing member combined with the pressure of the buffer gas acting on the piston's interior face retain the shutdown piston in the open position. During compressor shutdown, when the pressure of the buffer gas drops, the pressure of the process gas acting on the piston's exterior face overcomes the combined forces of the biasing member and the buffer gas to shift the shutdown piston to a closed position against an adjacent sealing surface to prevent contaminates from entering the housing interior.

46 Claims, 4 Drawing Sheets

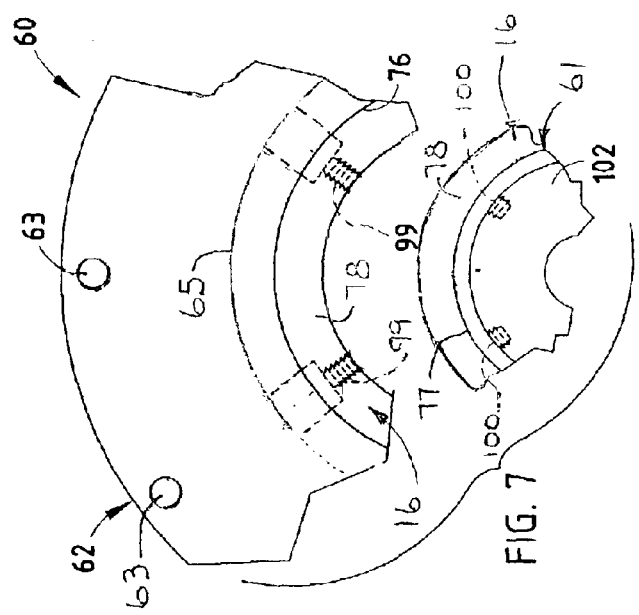

DRY GAS SHUTDOWN SEAL

This application claims the benefit of Provisional Application No. 60/307,271 Jul. 23, 2001.

BACKGROUND OF THE INVENTION

The present invention relates to dry gas seals for industrial compressors, blowers, vacuum pumps, expanders and the like, and in particular to a dry gas shutdown seal.

Dry gas seal systems are used in a wide variety of rotary shaft devices, including blowers, compressors, vacuum pumps, expanders and devices in the turbo machinery industry, all of which have critical sealing requirements. Dry gas seal systems provide a barrier between the gas in the working chamber, or process gas, and the external environment, to minimize the loss of process gas to the environment. These seals are positioned adjacent the interface of the rotating shaft with the stationary working chamber or housing. In general, dry gas seals may be of the circumferential type, or the face type, and are used in pipeline compressors, refineries, utility plants and other similar applications.

Buffer gas, which is normally regulated and filtered compressor discharge gas, is commonly used in dry gas seals to provide a clean seal environment. Used in conjunction with a process side labyrinth seal, buffer gas flows through the seal cavity, then through the labyrinth where it combines with the compressor process gas. A problem that typically occurs in centrifugal compressors is that once the compressor is shutdown, the source of buffer gas is lost. When this occurs, a reverse flow of residual process gas into the seal cavity results. Solid and/or liquid contaminates often contained in the process gas are then deposited on the critical dry seal surfaces. This contamination will eventually effect the performance of the dry gas seal, and shorten the life expectancy of the seal. As the seal life expectancy is decreased, the operating costs increase, because the seal must be replaced more frequently. This replacement requires that the compressor be shutdown more frequently, thereby reducing overall operational efficiency.

SUMMARY OF THE INVENTION

One aspect of the present invention is to provide a dry gas seal having a housing with an annularly-shaped channel disposed concentric with the drive shaft, and an inlet to introduce pressurized buffer gas into the housing interior. An annularly-shaped shutdown piston is slidably received in the housing channel for axial shifting, and includes a circumferential seal between its inside and outside surfaces, and an end seal. A biasing member resiliently urges the shutdown piston toward an open position, such that during compression operation, the forces generated by the biasing member combined with the pressure of buffer gas acting on the piston's interior face retain the shutdown piston in the open position. During compressor shutdown, when the pressure of the buffer gas drops, the pressure of the process gas acting on the piston's exterior face overcomes the combined forces of the biasing member and the buffer gas to shift the shutdown piston to a closed position against an adjacent sealing surface to prevent contaminates from entering the housing interior.

Another aspect of the present invention prevents contaminated process gas from entering the dry gas seal cavity when the compressor is near or at shutdown. In one embodiment, the shutdown seal system contains four major components that include a split housing with an annular opening, an annular-shaped ring or piston, a segmented circumferential seal ring and a rotating sleeve. The segmented circumferential seal is positioned with springs against the stationary seal housing and hard surfaced sleeve that rotates with the shaft. At low differential pressure, the seal is capable of regulating buffer gas flow into the compressor process, or seal against reverse process gas flow into the seal cavity. During compressor operation, the shutdown piston is held in the normally open (non-sealing) position by multiple fastened springs and gas pressure. The piston is sealed on the inside and outside diameters by fluorocarbon C-seals, and it has limited freedom to slide axially as regulated by spring and pressure forces. In the sealing mode, which occurs during compressor shutdown, the fluorocarbon C-seal mounted in the piston face creates a static seal against the adjacent gas seal shoulder retainer. Under normal operating conditions, filtered buffer gas enters the cavity between the dry gas seal and the circumferential seal. Buffer gas is delivered through a compressor port, which in turn feeds a sealed annular-shaped channel concentric to the compressor shaft and located on the outer diameter of the seal housing. Ports or radial holes in the seal housing direct the buffer gas inwardly from the channel and into the seal cavity. To create flow, the buffer pressure is regulated slightly above the process pressure. This pressure differential is regulated externally, and the circumferential seal acting against the sleeve and housing controls flow. When the compressor is shutdown (i.e., not rotating), the source of high pressure seal gas is lost and the pressure differential across the circumferential seal becomes zero or may actually reverse in direction. With this invention, process contamination of the gas seal is prevented at shutdown by the combined sealing operation of the circumferential seal and the closed shutdown piston. When the compressor is restarted, the source of filtered higher pressure seal gas is returned, and the piston recesses to its normally open position.

The dry gas shutdown seal has an uncomplicated construction, and improves the performance, efficiency and longevity of the compressor.

These and other advantages of the invention will be further understood and appreciated by those skilled in the art by reference to the following written specification, claims and appended drawings.

BRIEF DESCRIPTION OF THE DRAWINGS

FIG. 5 is fragmentary, exterior end elevational view of a split end housing portion of the dry gas shutdown seal.

FIG. 6 is a fragmentary, vertical cross-sectional view of the split end housing portion.

FIG. 7 is an exploded, interior end elevational view of the split end housing portion.

FIG. 8 is fragmentary, vertical cross-sectional view of a shutdown piston portion of the dry gas shutdown seal.

FIG. 9 is an interior end elevational view of the shutdown piston portion.

DETAILED DESCRIPTION OF THE PREFERRED EMBODIMENTS

Figure 3:
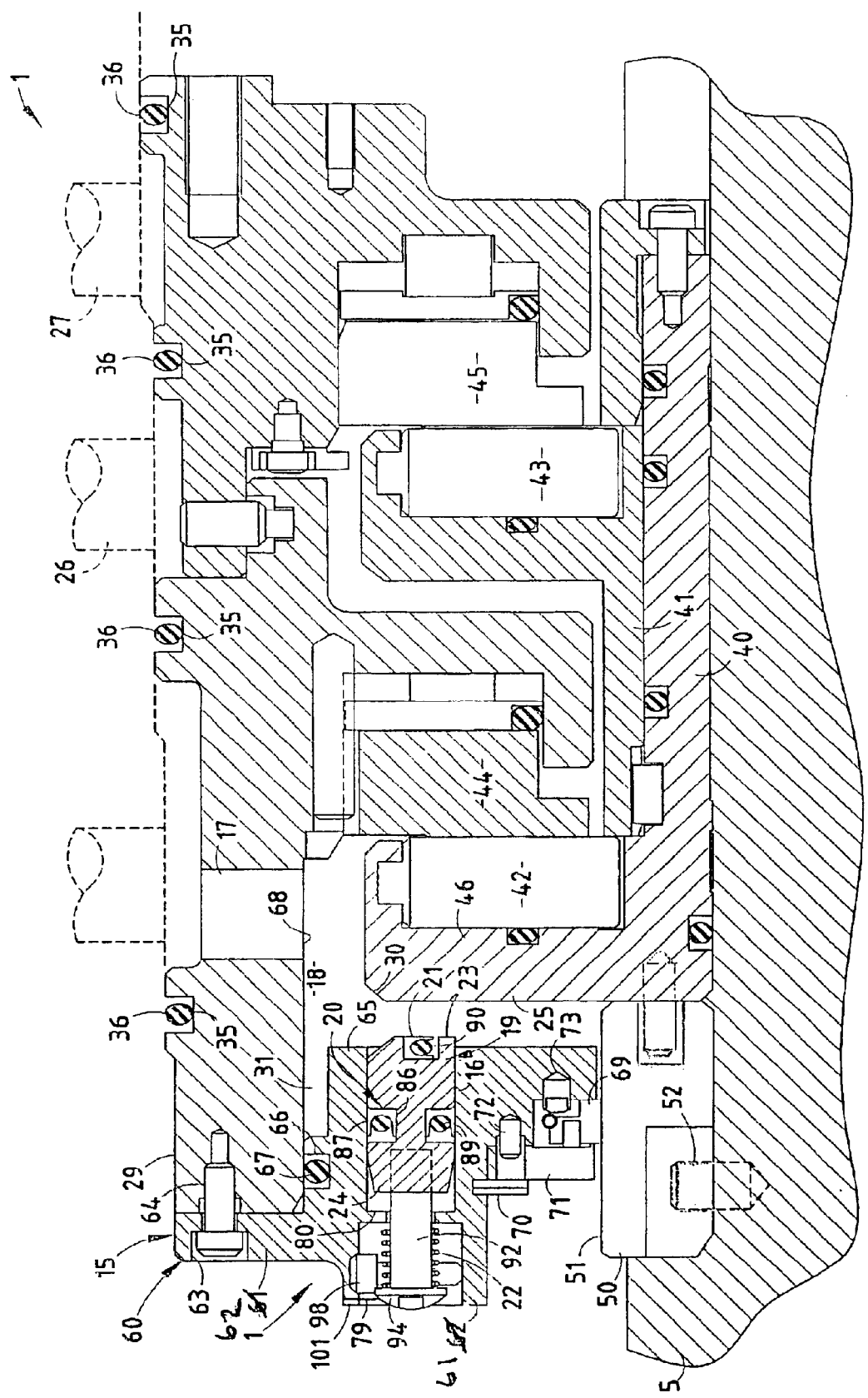
FIG. 3 is a fragmentary, vertical cross-sectional view of the dry gas shutdown seal, shown in a normally open operating position.
Figure 4:
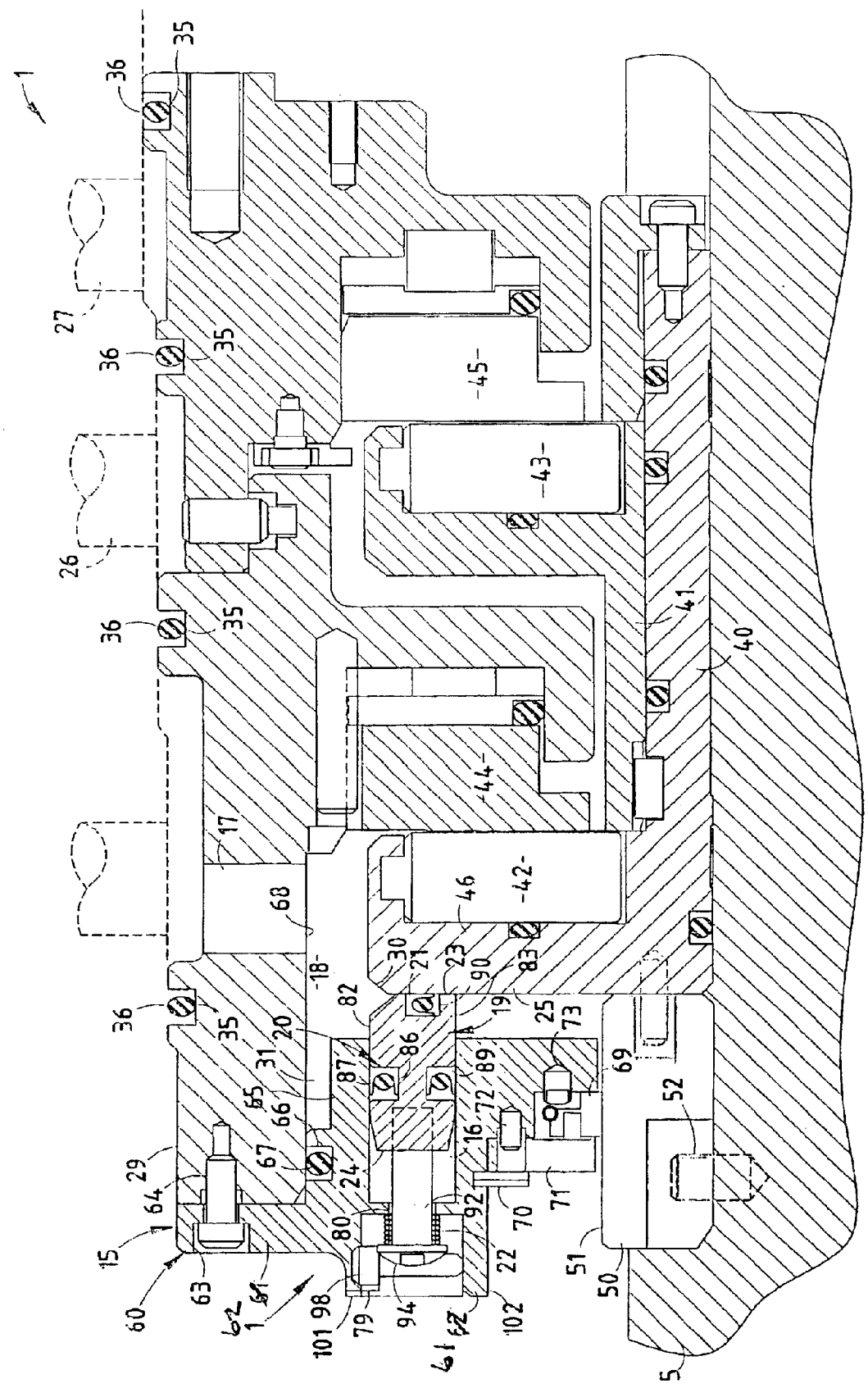
FIG. 4 is a fragmentary, vertical cross-sectional view of the dry gas shutdown seal, shown in a closed shutdown position.

For purpose of description herein the terms "upper", "lower", "right", "left", "rear", "front", "vertical", "horizontal" and derivatives thereof shall relate to the invention as oriented in FIGS. 3 and 4. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
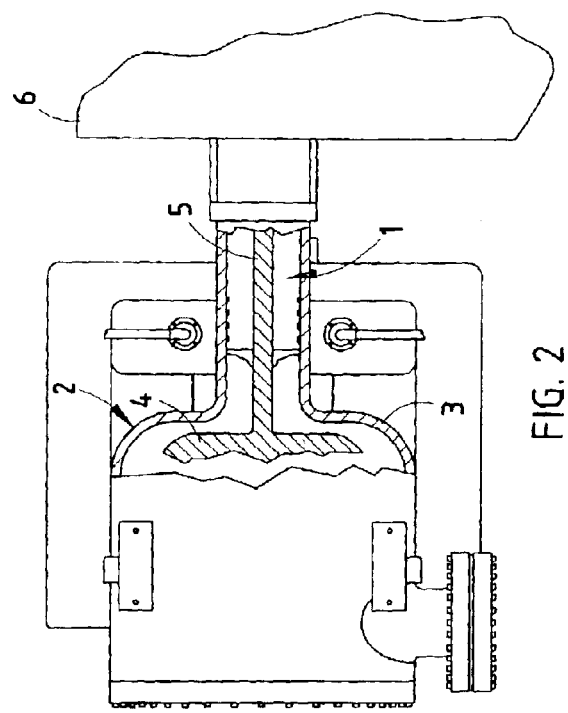
FIG. 2 is a schematic, cross-sectional view of the dry gas seal and associated centrifugal compressor.
Figure 1:
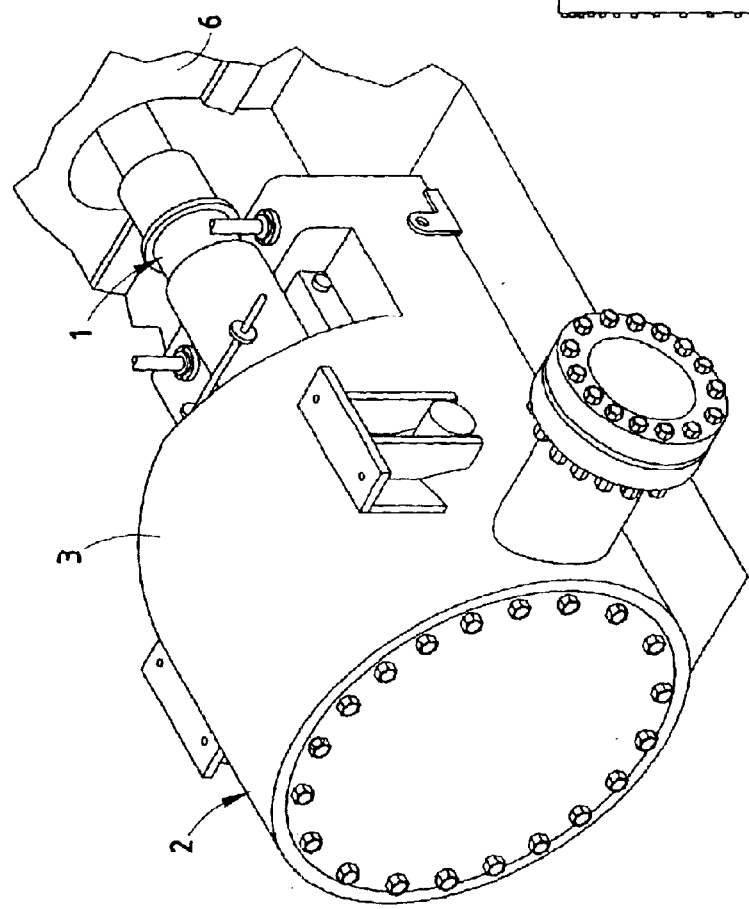
FIG. 1 is a perspective view of a dry gas shutdown seal embodying the present invention, shown connected to an associated centrifugal compressor.

The reference numeral 1 (FIGS. 1 and 2) generally designates a dry gas shutdown seal embodying the present invention. The illustrated dry gas shutdown seal 1 is shown in conjunction with a centrifugal compressor 2 of the type having a pressure chamber 3 which houses a rotating compressor member 4 that is driven by a compressor drive shaft 5. A bearing assembly 6 supports drive shaft 5 on the opposite side of compressor member 4.

In the example illustrated in FIGS. 3 and 4, dry gas shutdown seal 1 has a housing 15 with an annularly-shaped channel 16 disposed generally concentric with drive shaft 5, and at least one inlet 17 to introduce filtered, pressurized buffer gas into the housing interior 18. An annularly-shaped shutdown piston 19 is slidingly received in housing channel 16 for axial shifting, and includes a C-seal assembly 20 between its inside and outside surfaces, and an end seal 21. A biasing member 22 resiliently urges shutdown piston 19 toward the open position illustrated in FIG. 3, such that during operation of compressor 2, the forces generated by biasing member 22 combined with the pressure of buffer gas acting on the interior face 23 of shutdown piston 19 retain the shutdown piston in the open position (FIG. 3). During shutdown of compressor 2, the pressure of the buffer gas drops, and the pressure of the process gas acting on the exterior face 24 of shutdown piston 19 overcomes the combined forces of biasing member 22 and the buffer gas on the interior face 23 of shutdown piston 19 to shift the shutdown piston to the closed position against an adjacent sealing surface 25, as illustrated in FIG. 4, so as to prevent contaminates from entering housing interior 18.

With reference to FIGS. 3 and 4, the interior 18 of housing 15 is generally hollow, and shaped to receive compressor drive shaft 5 therethrough. Inlet 17 introduces filtered, pressurized buffer gas into housing interior 18 during the operation of compressor 2. The pressure of the buffer may be controlled by a conventional regulator. When compressor 2 is operating, the buffer gas is at a pressure of around five psig above the pressure of the process gas in chamber 3. In the illustrated example, a primary vent 26 and a secondary vent 27 are provided to vent the buffer gas from housing interior 18 to flare, or release into the atmosphere.

The illustrated housing 15 includes a primary housing 29 having a central cavity 30 defining a compressor side 31 oriented toward compressor 2, and a split end housing 60 detachably connected to the compressor end or process side of primary housing 29, as described in detail below. Primary housing 29 is stationary, and includes four outwardly opening, annularly-shaped recesses 35 in which elastomeric O-ring type seals 36 are received to seal against the interior of the pressure chamber portion 3 of centrifugal compressor 2, as shown schematically in FIG. 2.

The dry gas shutdown seal 1 shown in FIGS. 3 and 4 is a tandem dry gas face seal, and is somewhat similar to the dry gas seal disclosed in related U.S. Pat. No. 5,066,026, which is hereby incorporated herein by reference, and includes two shoulder retainers 40 and 41, which have shoulders 42 and 43 against which carbon face seals 44 and 45, respectively abut. The primary shoulder retainer 40 is connected with compressor drive shaft 5 and rotates therewith, and includes a radially extending, disk-shaped rotor portion 46 at the compressor end of primary shoulder retainer 40. Rotor 46 has a flat, radially extending outer sealing surface 25, which is spaced apart a predetermined axial distance from housing channel 16 for purposes to be described in greater detail hereinafter. A sleeve 50 is disposed within housing 15, and is received on and connected with compressor drive shaft 5 at a location adjacent to primary shoulder retainer 40 on the compressor side thereof, and has a generally smooth, cylindrically-shaped exterior surface 51. In the illustrated example, sleeve 50 is keyed to drive shaft 5 by a pin 52.

Split end housing 60 (FIGS. 3 and 4), which is attached to the compressor end or process side of primary housing 15, includes inner and outer end housing members 61 and 62, which mate together concentrically to surround the associated portion of compressor drive shaft 5. With reference to FIGS. 5–9, outer end housing member 62 includes a plurality of countersunk fastener apertures 63 through which fasteners 64 (FIGS. 3 and 4) extend to attach split end housing 60 to the compressor end of primary housing 15. Outer end housing member 62 also includes an axially inwardly extending neck portion 65 (FIGS. 5–9) with a U-shaped upwardly opening annular groove 66 in which an elastomeric O-ring type seal 67 (FIGS. 3 and 4) is received to seal against an interior surface 68 of primary housing 15. Outer end housing member 62 also includes an axially outwardly extending collar 101.

Inner end housing member 61 also has a generally annular end elevational shape, with a stepped exterior face 103, defining an axially outwardly extending collar 102, and a flat interior face 104. The radially inward portion of inner end housing member 61 includes a circumferential shaft seal 69, which abuts and seals against the exterior surface 51 of sleeve 50. Shaft seal 69 is retained in place adjacent the center of split housing 60 by annular retainer disks 70 and 71, and pins 72 and 73.

The illustrated housing channel 16 is disposed concentric with compressor drive shaft 5, and includes an open end 74 which opens into the interior 18 of housing 15, and a base end 75 which communicates with the compressor pressure chamber 3 and associated process pressure therein. Housing channel 16 is defined by a cylindrical outside surface 76, a cylindrical inside surface 77 and an end wall 78. The outside and inside surfaces 76 and 77 of housing channel 16 are smooth and parallel to closely receive shutdown piston 19 therein in a sliding, sealing relationship, which permits shutdown piston 19 to shift axially between the open position shown in FIG. 3 and the closed position shown in FIG. 4.

As best shown in FIGS. 5–7, the illustrated housing channel 16 is disposed in split end housing 60, and spans between inner and outer end housing members 61 and 62, such that the outside surface 76 of housing channel 16 is disposed in outer end housing member 62, and the inside surface 77 of housing channel 16 is disposed in inner end housing member 61. In the illustrated example, housing channel 16 is located radially centrally at the junction of inner and outer end housing members 61 and 62. Removable fasteners 98 connect the inner and outer end housing members 61 and 62, such that the outside and inside surfaces 76 and 77 of housing channel 16 can be precision ground prior to interconnecting inner and outer end housing members 61 and 62, so as to achieve a close, sealing fit with shutdown piston 19. Surfaces 76 and 77 are finely ground to a very smooth condition, which typically cannot be achieved by conventional machining. The illustrated fasteners 98 comprise threaded fasteners which extend radially between inner and outer end housing members 61 and 62. With reference to FIG. 5, the fasteners 98 are inserted through radially extending apertures 99 in the outer collar portion 101 of outer end housing member 62, and threaded ends of fasteners 98 are received and retained in threaded, radially extending apertures 100 in the collar portion 102 of inner end housing member 61. A plurality of circumferentially spaced, axially extending apertures 79 with reduced diameter neck portions 80, extend from the compressor or process side of split end housing 60, through end wall 78, and into the base end 75 of housing channel 16 to communicate with the same. Apertures 79 are positioned circumferentially between fasteners 98, as best shown in FIG. 5.

With reference to FIGS. 8 and 9, the illustrated shutdown piston 19 has a generally annularly-shaped end elevational configuration, comprising a radially outer surface 82, a radially inner surface 83 and opposite end surfaces 84 and 85. Outer surface 82 includes a radially outwardly opening U-shaped groove 86 in which a C-shaped spring activated fluorocarbon seal 87 (FIGS. 3 and 4) is retained. Similarly, inner surface 83 (FIGS. 8 and 9) includes a radially inwardly opening annular groove 88 in which a second spring activated fluorocarbon C-shaped seal 89 (FIGS. 3 and 4) is received. The end surface 84 (FIGS. 8 and 9) of shutdown piston 19 also includes an axially inwardly opening annular groove 90 in which a third spring activated fluorocarbon C-shaped seal 21 (FIGS. 3 and 4) is retained. A plurality of fasteners 92 are positioned within apertures 79, and have their axially interior ends connected with the adjacent end 85 of shutdown piston 19 by means such as threads or the like, and serve to limit the axial shifting of shutdown piston 19 in housing channel 16. In the illustrated example, biasing member 22 is in the form of compression springs, which are positioned about the outer ends of fasteners 92, and are captured in place between the axially interior surfaces of apertures 79 and the heads 94 of fasteners 92, so as to bias shutdown piston 19 axially outwardly toward the open position illustrated in FIG. 3.

When compressor 2 is operating, as shown in FIG. 3, the pressurized buffer gas in housing interior 18 acts on the inner end 23 of shutdown piston 19 to urge the shutdown piston axially outwardly toward the compressor end of the seal assembly to retain shutdown piston 19 in the open position illustrated in FIG. 3. Circumferential seal 69 regulates the flow of the buffer gas into the compressor process gas. As noted above, compression springs 22 also bias shutdown piston 19 axially outwardly to retain the same in the open position shown in FIG. 3. Because the pressure of the buffer gas is typically generated by rotation of impellers connected to drive shaft 5, when compressor 2 near or is at shutdown, the pressure of the buffer gas drops to a predetermined level. In one working embodiment of the present invention, the pressure differential across seal 69 becomes zero, or may actually reverse in direction. At low reverse differential pressures (up to 15 psi) seal 69 typically creates an effective barrier against flow reversal. At a reverse pressure differential above around 15 psi, to prevent process gas from leaking passed shaft seal 69 and into the interior 18 of housing 15, shutdown piston 19 shifts axially inwardly, so that end seal 21 abuts and seals firmly against the sealing surface 25 of the rotor portion 46 of primary shoulder retainer 40. The axial inward shifting of shutdown piston 19 is a result of the pressure of the process gas acting on the exterior face 24 of shutdown piston 19, which generates sufficient force to overcome the combined forces of the compression springs 22 and the buffer gas acting on the interior face 23 of shutdown piston 19. As a result, when compressor 2 is near or at shutdown, a static seal is created between end seal 21 and the sealing surface 25 of rotor 46, which is sufficient to prevent contaminates and/or process gases from entering the interior 18 of housing 15.

Dry gas shutdown seal 1 is preferably pre-assembled as a unit or cartridge for assembly onto drive shaft 5. Sleeve 50 is normally mounted on drive shaft 5 first, and the balance of the assembly is then mounted on drive shaft 5. Sleeve 50 could also be made integral with dry gas seal sleeve 40.

In the foregoing description, it will be readily appreciated by those skilled in the art that modification may be made to the invention without departing from the concepts disclosed herein. Such modifications are to be considered as included in the following claims, unless these claims by their language expressly state otherwise.

What is claimed is:

1. In a dry gas seal for centrifugal compressors of the type having a pressure chamber which houses a rotating compressor member that is driven by a compressor drive shaft, the improvement comprising:

a housing having a generally hollow interior shaped to receive the compressor drive shaft therethrough, and an annularly-shaped channel disposed concentric with the compressor drive shaft and including an open end thereof opening into said housing interior, and a base end thereof configured to communicate with the compressor pressure chamber and associated process pressure therein;

means for pressurizing said housing with a buffer gas during compressor operation;

a rotor disposed within said housing, configured to be received on and connected with the compressor drive shaft at a predetermined location thereon, and having a radially extending sealing surface disposed a predetermined, spaced apart axial distance from said housing channel;

a sleeve disposed within said housing, configured to be received on and connected with the compressor drive shaft at a predetermined location thereon, and having a generally smooth, cylindrically-shaped exterior surface;

a circumferential shaft seal supported on said housing and sealingly engaging the exterior surface of said sleeve to restrict the flow of contaminates from the compressor into said housing interior, and regulate the flow of buffer gas into the compressor pressure chamber;

an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face shaped to communicate with the compressor pressure chamber and associated process pressure therein;

a circumferential piston seal operably positioned between said housing channel and said outside and inside surfaces of said shutdown piston to resist fluid flow between the compressor and said housing interior, yet permit said shutdown piston to shift axially between said open and closed positions;

an end seal disposed on said interior end face of said shutdown piston, and sealingly abutting said sealing surface of said rotor when said shutdown piston is in said closed position; and a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

2. A dry gas seal as set forth in claim 1, wherein:

said exterior end face of said shutdown piston includes an annularly-shaped first groove which opens axially toward said sealing surface of said rotor; and said end seal comprises a first generally circular seal member positioned in said first groove with an outer portion thereof protruding outwardly from said exterior end face of said shutdown piston to abuttingly engage said sealing surface of said rotor in said closed position to create a static seal therebetween.

3. A dry gas seal as set forth in claim 2, wherein:

said first seal member comprises a first spring activated fluorocarbon C-shaped seal.

4. A dry gas seal as set forth in claim 3, wherein:

said housing channel is defined by a cylindrical outside surface, a cylindrical inside surface and an end wall; and said circumferential piston seal comprises:
  a second generally circular seal member positioned between said outside surface of said housing channel and said outside surface of said shutdown piston; and
  a third generally circular seal member positioned between said inside surface of said housing channel and said inside surface of said shutdown piston.

5. A dry gas seal as set forth in claim 4, wherein:

said outside surface of said shutdown piston includes an annularly-shaped second groove which opens radially outwardly; and said second seal member is positioned in said second groove.

6. A dry gas seal as set forth in claim 5, wherein:

said inside surface of said shutdown piston includes an annularly-shaped third groove which opens radially inwardly; and said third seal member is positioned in said third groove.

7. A dry gas seal as set forth in claim 6, wherein:

said second seal comprises a second spring activated fluorocarbon C-shaped seal.

8. A dry gas seal as set forth in claim 7, wherein:

said third seal comprises a third spring activated fluorocarbon C-shaped seal.

9. A dry gas seal as set forth in claim 8, wherein:

said housing includes a primary housing having a central cavity and a compressor side oriented toward the compressor.

10. A dry gas seal as set forth in claim 9, wherein:

said housing includes a split end housing having radially inner and outer end housing members which mate together concentrically around the compressor drive shaft, and are connected to the compressor side of said primary housing.

11. A dry gas seal as set forth in claim 10, wherein:

said housing channel is disposed in said split end housing and spans between said inner and outer end housing members, such that said outside surface of said housing channel is disposed in said outer end housing member, and said inside surface of said housing channel is disposed in said inner end housing member.

12. A dry gas seal as set forth in claim 11, wherein:

said split end housing includes removable fasteners connecting said inner and outer end housing members, whereby said outside and inside surfaces of said housing channel can be precision ground prior to interconnecting said inner and outer end housing members to achieve a close fit with said shutdown piston.

13. A dry gas seal as set forth in claim 12, wherein:

said removable fasteners comprise threaded fasteners extending radially between said inner and outer end housing members.

14. A dry gas seal as set forth in claim 13, wherein:

said split end housing includes a plurality of apertures extending axially through the end wall of said housing channel to communicate with the compressor pressure chamber.

15. A dry gas seal as set forth in claim 14, wherein:

said biasing member includes a plurality of axially oriented springs.

16. A dry gas seal as set forth in claim 15, including:

fasteners extending through said apertures in said end wall of said housing channel, and connected with said exterior end face of said shutdown piston to limit axial shifting of said shutdown piston in said housing channel.

17. A dry gas seal as set forth in claim 16, wherein:

said springs are mounted concentrically on said fasteners.

18. A dry gas seal as set forth in claim 1, wherein:

said housing channel is defined by a cylindrical outside surface, a cylindrical inside surface and an end wall; and said circumferential piston seal comprises:
  a generally circular seal member positioned between said outside surface of said housing channel and said outside surface of said shutdown piston; and
  a generally circular seal member positioned between said inside surface of said housing channel and said inside surface of said shutdown piston.

19. A dry gas seal as set forth in claim 1, wherein:

said outside surface of said shutdown piston includes an annularly-shaped groove which opens:radially outwardly; and including
  a seal member positioned in said groove.

20. A dry gas seal as set forth in claim 1, wherein:

said inside surface of said shutdown piston includes an annularly-shaped groove which opens radially inwardly; and including
  a seal member positioned in said groove.

21. A dry gas seal as set forth in claim 1, wherein:
said housing includes a primary housing having a central cavity and a compressor side oriented toward the compressor.

22. A dry gas seal as set forth in claim 21, wherein:
said housing includes a split end housing having radially inner and outer end housing members which mate together concentrically around the compressor drive shaft, and are connected to the compressor side of said primary housing.

23. A dry gas seal as set forth in claim 22, wherein:
said housing channel is disposed in said split end housing and spans between said inner and outer end housing members, such that said outside surface of said housing channel is disposed in said outer end housing member, and said inside surface of said housing channel is disposed in said inner end housing member.

24. A dry gas seal as set forth in claim 23, wherein:
said split end housing includes removable fasteners connecting said inner and outer end housing members, whereby said outside and inside surfaces of said housing channel can be precision ground prior to interconnecting said inner and outer end housing members to achieve a close fit with said shutdown piston.

25. A dry gas seal as set forth in claim 24, wherein:
said removable fasteners comprise threaded fasteners extending radially between said inner and outer end housing members.

26. A dry gas seal as set forth in claim 25, wherein:
said split end housing includes a plurality of apertures extending axially through the end wall of said housing channel to communicate with the compressor pressure chamber.

27. A dry gas seal as set forth in claim 1, wherein:
said biasing member includes a plurality of axially oriented springs.

28. In a centrifugal compressor of the type having a pressure chamber which houses a rotating compressor member that is driven by a compressor drive shaft, the improvement of a dry gas seal therefor comprising:
a housing having a generally hollow interior receiving said compressor drive shaft therethrough, and an annularly-shaped channel disposed concentric with said compressor drive shaft and including an open end thereof opening into said housing interior, and a base end thereof configured to communicate with said compressor pressure chamber and associated process pressure therein;
means for pressurizing said housing with a buffer gas during compressor operation;
a rotor disposed within said housing, received on and connected with said compressor drive shaft at a predetermined location thereon, and having a radially extending sealing surface disposed a predetermined, spaced apart axial distance from said housing channel;
a sleeve disposed within said housing, received on and connected with said compressor drive shaft at a predetermined location thereon, and having a generally smooth, cylindrically-shaped exterior surface;
a circumferential shaft seal supported on said housing and sealingly engaging the exterior surface of said sleeve to restrict the flow of contaminates from said compressor into said housing interior, and regulate the flow of buffer gas into said compressor;
an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face communicating with said compressor pressure chamber and associated process pressure therein;
a circumferential piston seal operably positioned between said housing channel and said outside and inside surfaces of said shutdown piston to resist fluid flow between said compressor and said housing interior, yet permit said shutdown piston to shift axially between said open and closed positions;
an end seal disposed on said interior end face of said shutdown piston, and sealingly abutting said sealing surface of said rotor when said shutdown piston is in said closed position; and
a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

29. A compressor as set forth in claim 28, wherein:
said exterior end face of said shutdown piston includes an annularly-shaped first groove which opens axially toward said sealing surface of said rotor; and
said end seal comprises a first generally circular seal member positioned in said first groove with an outer portion thereof protruding outwardly from said exterior end face of said shutdown piston to abuttingly engage said sealing surface of said rotor in said closed position to create a static seal therebetween.

30. A compressor as set forth in claim 29, wherein:
said first seal member comprises a first spring activated fluorocarbon C-shaped seal.

31. A compressor as set forth in claim 30, wherein:
said housing channel is defined by a cylindrical outside surface, a cylindrical inside surface and an end wall; and
said circumferential piston seal comprises:
a second generally circular seal member positioned between said outside surface of said housing channel and said outside surface of said shutdown piston; and
a third generally circular seal member positioned between said inside surface of said housing channel and said inside surface of said shutdown piston.

32. A compressor as set forth in claim 31, wherein:
said outside surface of said shutdown piston includes an annularly-shaped second groove which opens radially outwardly; and
said second seal member is positioned in said second groove.

33. A compressor as set forth in claim 32, wherein:
said inside surface of said shutdown piston includes an annularly-shaped third groove which opens radially inwardly; and
said third seal member is positioned in said third groove.

34. A compressor as set forth in claim 33, wherein:
said second seal comprises a second spring activated fluorocarbon C-shaped seal.

35. A compressor as set forth in claim 34, wherein:
said third seal comprises a third spring activated fluorocarbon C-shaped seal.

36. A compressor as set forth in claim 35, wherein:
said housing includes a primary housing having a central cavity and a compressor side oriented toward said compressor.

37. A compressor as set forth in claim 36, wherein:
said housing includes a split end housing having radially inner and outer end housing members which mate together concentrically around said compressor drive shaft, and are connected to said compressor side of said primary housing.

38. A compressor as set forth in claim 37, wherein:
said housing channel is disposed in said split end housing and spans between said inner and outer end housing members, such that said outside surface of said housing channel is disposed in said outer end housing member, and said inside surface of said housing channel is disposed in said inner end housing member.

39. A compressor as set forth in claim 38, wherein:
said split end housing includes removable fasteners connecting said inner and outer end housing members, whereby said outside and inside surfaces of said housing channel can be precision ground prior to interconnecting said inner and outer end housing members to achieve a close fit with said shutdown piston.

40. A compressor as set forth in claim 39, wherein:
said removable fasteners comprise threaded fasteners extending radially between said inner and outer end housing members.

41. A compressor as set forth in claim 40, wherein:
said split end housing includes a plurality of apertures extending axially through the end wall of said housing channel to communicate with the compressor pressure chamber.

42. A compressor as set forth in claim 41, wherein:
said biasing member includes a plurality of axially oriented springs.

43. In a dry gas seal for centrifugal compressors of the type having a pressure chamber which houses a rotating compressor member that is driven by a compressor drive shaft, the improvement comprising:
a housing having a generally hollow interior shaped to receive the compressor drive shaft therethrough, an inlet to introduce pressurized buffer gas into said housing interior during compressor operation, and an annularly-shaped channel disposed concentric with the compressor drive shaft and including an open end thereof opening into said housing interior, and a base end thereof configured to communicate with the compressor pressure chamber and associated process pressure therein;
a rotor disposed within said housing, configured to be received on and connected with the compressor drive shaft at a predetermined location thereon, and having a radially extending sealing surface disposed a predetermined, spaced apart axial distance from said housing channel;
a sleeve disposed within said housing, configured to be received on and connected with the compressor drive shaft at a predetermined location thereon, and having a generally smooth, cylindrically-shaped exterior surface;
a circumferential shaft seal supported on said housing and sealingly engaging the exterior surface of said sleeve to restrict the flow of contaminates from the compressor into said housing interior, and regulate the flow of buffer gas into the compressor pressure chamber;
an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face shaped to communicate with the compressor pressure chamber and associated process pressure therein;
said exterior end face of said shutdown piston having an annularly-shaped first groove which opens axially toward said sealing surface of said rotor;
a circumferential piston seal operably positioned between said housing channel and said outside and inside surfaces of said shutdown piston to resist fluid flow between the compressor and said housing interior, yet permit said shutdown piston to shift axially between said open and closed positions;
an end seal disposed on said interior end face of said shutdown piston, and sealingly abutting said sealing surface of said rotor when said shutdown piston is in said closed position;
said end seal comprising a first spring activated fluorocarbon C-shaped seal member positioned in said first groove with an outer portion thereof protruding outwardly from said exterior end face of said shutdown piston to abuttingly engage said sealing surface of said rotor in said closed position to create a static seal therebetween; and
a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

44. In a dry gas seal for centrifugal compressors of the type having a pressure chamber which houses a rotating compressor member that is driven by a compressor drive shaft, the improvement comprising:
a housing having a generally hollow interior shaped to receive the compressor drive shaft therethrough, an inlet to introduce pressurized buffer gas into said housing interior during compressor operation, and an annularly-shaped channel disposed concentric with the compressor drive shaft and including an open end thereof opening into said housing interior, and a base end thereof configured to communicate with the compressor pressure chamber and associated process pressure therein;
a rotor disposed within said housing, configured to be received on and connected with the compressor drive shaft at a predetermined location thereon, and having a radially extending sealing surface disposed a predetermined, spaced apart axial distance from said housing channel;

a sleeve disposed within said housing, configured to be received on and connected with the compressor drive shaft at a predetermined location thereon, and having a generally smooth, cylindrically-shaped exterior surface;

a circumferential shaft seal supported on said housing and sealingly engaging the exterior surface of said sleeve to restrict the flow of contaminates from the compressor into said housing interior, and regulate the flow of buffer gas into the compressor pressure chamber;

an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face shaped to communicate with the compressor pressure chamber and associated process pressure therein;

said inside surface of said shutdown piston includes an annularly-shaped groove which opens radially inwardly;

a circumferential piston seal operably positioned between said housing channel and said outside and inside surfaces of said shutdown piston to resist fluid flow between the compressor and said housing interior, yet permit said shutdown piston to shift axially between said open and closed positions, and including a seal member positioned in said groove in said inside surface of said shutdown piston;

an end seal disposed on said interior end face of said shutdown piston, and sealingly abutting said sealing surface of said rotor when said shutdown piston is in said closed position; and a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

45. In a dry gas seal for centrifugal compressors and the like of the type having a pressure chamber which houses a rotating compressor member that is driven by a compressor drive shaft, the improvement comprising:

a housing having a generally hollow interior shaped to receive the compressor drive shaft therethrough, an inlet to introduce pressurized buffer gas into said housing interior during compressor operation, and an annularly-shaped channel disposed concentric with the compressor drive shaft and including an open end thereof opening into said housing interior, and a base end thereof configured to communicate with the compressor pressure chamber and associated process pressure therein;

said housing includes a primary housing having a central cavity and a compressor side oriented toward the compressor, and a split end housing having radially inner and outer end housing members which mate together concentrically around the compressor drive shaft, and are connected to the compressor side of said primary housing;

a rotor disposed within said housing, configured to be received on and connected with the compressor drive shaft at a predetermined location thereon, and having a radially extending sealing surface disposed a predetermined, spaced apart axial distance from said housing channel;

a sleeve disposed within said housing, configured to be received on and connected with the compressor drive shaft at a predetermined location thereon, and having a generally smooth, cylindrically-shaped exterior surface;

a circumferential shaft seal supported on said housing and sealingly engaging the exterior surface of said sleeve to restrict the flow of contaminates from the compressor into said housing interior, and regulate the flow of buffer gas into the compressor pressure chamber;

an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face shaped to communicate with the compressor pressure chamber and associated process pressure therein;

a circumferential piston seal operably positioned between said housing channel and said outside and inside surfaces of said shutdown piston to resist fluid flow between the compressor and said housing interior, yet permit said shutdown piston to shift axially between said open and closed positions;

an end seal disposed on said interior end face of said shutdown piston, and sealingly abutting said sealing surface of said rotor when said shutdown piston is in said closed position; and a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

46. In a dry gas seal for centrifugal compressors and the like of the type having a pressure chamber which houses a rotating compressor member that is driven by a compressor drive shaft, the improvement comprising:

a housing having a generally hollow interior shaped to receive the compressor drive shaft therethrough, an inlet to introduce pressurized buffer gas into said housing interior during compressor operation, and an annularly-shaped channel disposed concentric with the compressor drive shaft and including an open end thereof opening into said housing interior, and a base end thereof configured to communicate with the compressor pressure chamber and associated process pressure therein;

a rotor disposed within said housing, configured to be received on and connected with the compressor drive shaft at a predetermined location thereon, and having a radially extending sealing surface disposed a predetermined, spaced apart axial distance from said housing channel;

a sleeve disposed within said housing, configured to be received on and connected with the compressor drive shaft at a predetermined location thereon, and having a generally smooth, cylindrically-shaped exterior surface;

a circumferential shaft seal supported on said housing and sealingly engaging the exterior surface of said sleeve to restrict the flow of contaminates from the compressor into said housing interior, and regulate the flow of buffer gas into the compressor pressure chamber;

an annularly-shaped shutdown piston slidably received in said housing channel for axial shifting therein between a retracted, open position, and an extended, closed position; said shutdown piston including a cylindrical outside surface, a cylindrical inside surface, an interior end face communicating with said housing interior and an exterior end face shaped to communicate with the compressor pressure chamber and associated process pressure therein;

said exterior end face of said shutdown piston includes an annularly-shaped first groove which opens axially toward said sealing surface of said rotor;

a circumferential piston seal operably positioned between said housing channel and said outside and inside surfaces of said shutdown piston to resist fluid flow between the compressor and said housing interior, yet permit said shutdown piston to shift axially between said open and closed positions;

an end seal disposed on said interior end face of said shutdown piston, and sealingly abutting said sealing surface of said rotor when said shutdown piston is in said closed position;

said end seal comprising a first generally circular spring activated fluorocarbon C-shaped seal member position in said first groove with an outer portion thereof protruding outwardly from said exterior end face of said shutdown piston to abuttingly engage said sealing surface of said rotor in said closed position to create a static seal therebetween; and a biasing member operably connected with said shutdown piston and resiliently urging the same toward said open position, whereby during compressor operation, the forces generated by said biasing member combined with the force generated by the pressure of the buffer gas acting on said interior face of said shutdown piston retain said shutdown piston in said open position, and during compressor shutdown, when the pressure of the buffer gas drops to a predetermined level, the pressure of the process gas acting on said exterior face of said shutdown piston generates sufficient force to overcome the combined forces of said biasing member and the buffer gas acting on said interior face of said shutdown piston, so as to shift said shutdown piston to said closed position to prevent contaminates from entering said housing interior.

* * * * *